United States Patent [19]
Jenkins

[11] Patent Number: 5,974,230
[45] Date of Patent: Oct. 26, 1999

[54] LABEL GENERATING TECHNIQUES AND APPARATUS

[76] Inventor: Peter G. Jenkins, 7019 Lake Ave., Elyria, Ohio 44035

[21] Appl. No.: 08/909,649

[22] Filed: Aug. 12, 1997

[51] Int. Cl.[6] .............................. G06T 15/00; G05B 11/00
[52] U.S. Cl. ........................... 395/109; 395/109; 395/117
[58] Field of Search ..................................... 395/101, 109, 395/117, 114, 115, 116, 110, 111; 400/76

[56] References Cited

U.S. PATENT DOCUMENTS

| | | | |
|---|---|---|---|
| 5,045,967 | 9/1991 | Igrashi | 395/112 |
| 5,425,138 | 6/1995 | Kumakawa | 395/146 |
| 5,575,573 | 11/1996 | Ito et al. | 400/76 |
| 5,621,864 | 4/1997 | Benade et al. | 395/117 |
| 5,677,999 | 10/1997 | Hidaka et al. | 395/102 |

*Primary Examiner*—David K. Moore
*Assistant Examiner*—Douglas Q. Tran
*Attorney, Agent, or Firm*—Renner, Kenner, Greive, Bobak, Taylor & Weber

[57] ABSTRACT

A label generating technique and apparatus allows for the generation of an array of labels for attachment to a assemblage of file folders without the implementation of a confining template. A library of alpha-numeric color coded graphics is available for application to each label as a sheet of pressure sensitive adhesive paper is introduced to a printer. An operator enters the data respecting various labels from a mass data bank. The data entry includes both typed information and color-coded graphics from the library. The final label may be viewed upon a monitor. Upon completion of the labels, they are printed upon a pressure sensitive adhesive sheet, laminated with a clear cover sheet, die cut, and removed and applied to the edge of a file folder. The technique of the invention basically employs clip art or cut and paste techniques for generating a label having printed information and an array of color coded graphics.

7 Claims, 1 Drawing Sheet

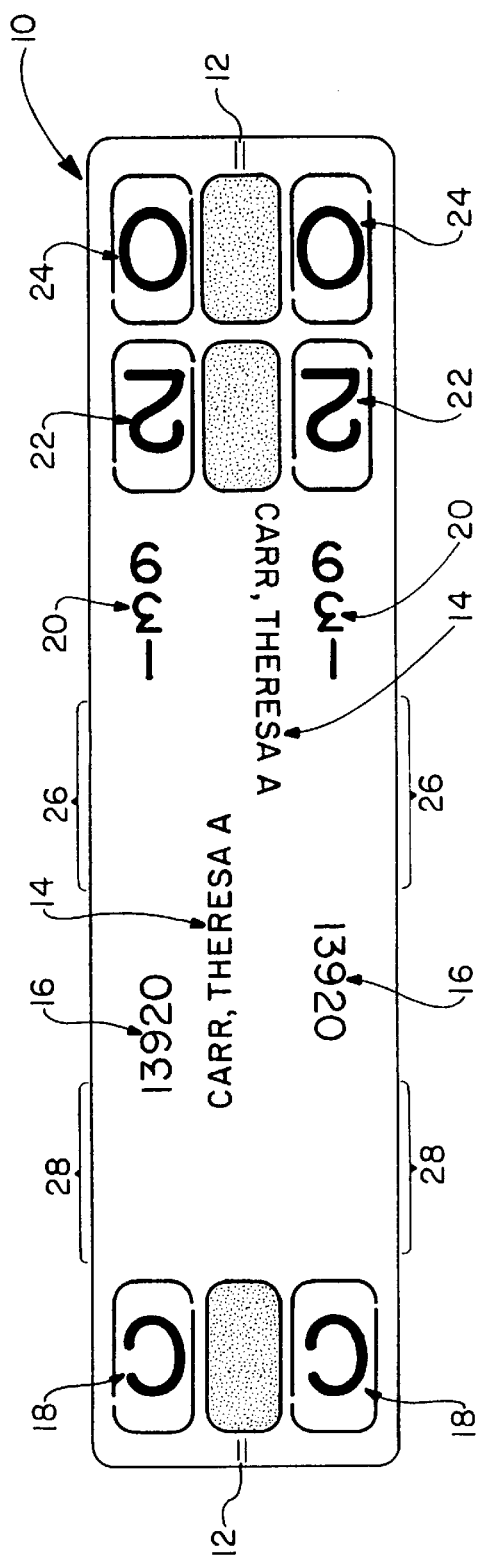
FIG.-1
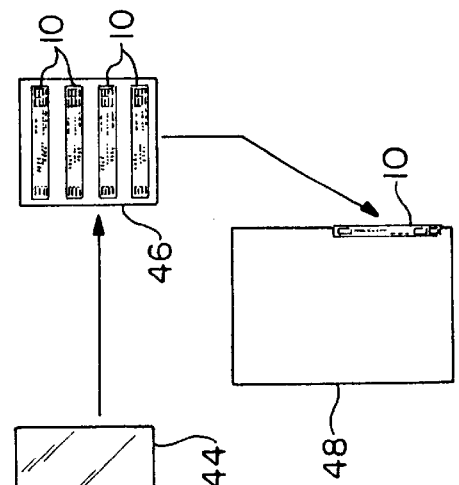
FIG.-2
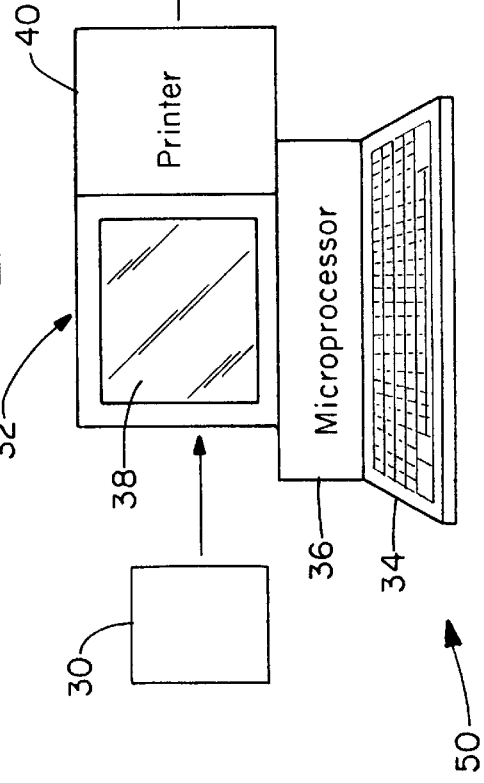

LABEL GENERATING TECHNIQUES AND APPARATUS

TECHNICAL FIELD

The invention herein resides in the art of generating labels. In general, the invention relates to the generation of pressure sensitive adhesive labels adapted for application to file folders. More particularly, the invention relates to the art of generating an assemblage of files, each labeled with data from a mass data bank. Specifically, the invention relates to technique and apparatus for generating an array of labels for attachment to an assemblage of file folders—each label being custom generated with "clip art" graphics.

BACKGROUND ART

It is often required to generate a file system from a large database of random data. Such massive data banks and file systems occur at many facilities, such as hospitals, health medical organizations, car dealerships, government agencies, and the like. When a file system is being developed, or when the system is being converted from one format to another, the database is often not ordered. Moreover, the data available for each label is often not consistent from label to label. Some labels will necessarily display more data than others. For example, where a label might be intended to include a patient's name, case number, birth date, social security number, insurance provider, diagnosis code and bar code associated with that data, it is not unusual for some of the data to be absent. Many individuals do not know their social security number, and a surprising number of elderly people do not recall their birth date. As a consequence, those data entries on the label may be absent— as may be the bar code if it is intended to include information respecting the missing data. In the past, it has been known from U.S. Pat. No. 4,939,674 to generate an array of labels from a database in which a template is developed for the labels and imprinted upon them. The data is then entered into associated areas on the label within the template. According to this prior art teaching, a specific label format is defined with discrete regions on the label for each of the various data entries. Those discrete regions are specifically defined and always present on the label within the template, whether the data associated with the specific region is entered or not. Notably, the template is first printed upon the label and the data entered thereafter.

The prior art techniques and apparatus for developing labels from large databases has typically been quite rigid as to format. The prior art has not been easily tailored to accomodate variations in the nature of the available data from label to label.

There is a need in the art for a technique and apparatus for generating an array of labels from a mass data bank of random data for ultimate attachment to an assemblage of file folders, and in which the technique and apparatus is flexible to accomodate variations in the data available for each of the various labels. Moreover, there is a need in the art for such a technique and apparatus which forgoes the use of a template, generating each label individually from a library of graphics, employing clip art techniques, such that each label is complete with the data available, with no defined regions having data absent, and which accommodates a wide variation in label format to accomodate the generation of arrays of labels for a wide range of applications.

DISCLOSURE OF INVENTION

In light of the foregoing, it is a first aspect of the invention to provide a label generating technique and apparatus which is flexible in implementation, accommodating a wide range of variations of label format.

Another aspect of the invention is the provision of a label generating technique and apparatus which does not employ a templet.

A further aspect of the invention is the provision of a label generating technique and apparatus in which each label is complete onto itself, irrespective of whether anticipated data entries are provided thereon.

Still another aspect of the invention is the provision of a label generating technique and apparatus which employs a library of graphics adapted for generating individual labels employing clip art techniques.

Yet a further aspect of the invention is the provision of a label generating technique and apparatus which is readily implemented within the state of the art.

A further aspect of the invention is the provision of a label generating technique and apparatus which is reliable and cost effective in implementation.

The foregoing and other aspects of the invention which will become apparent as the detailed description proceeds are achieved by a method for generating labels from data in a mass data bank, comprising: defining a label blank; entering alphabetic data into first selected regions of said label blank; entering numeric data into second selected regions of said label blank; retrieving preset graphics associated with selected portions of said alphabetic and numeric data from a graphics library and entering said retrieved graphics into third selected regions of said label blank; and printing said label blank, containing said alphabetic and numeric data and said retrieved graphics, upon a label stock material.

Other aspects which will become apparent herein are attained by apparatus for generating labels from a mass data bank, comprising: a source of label stock; a printer receiving label stock from said source of label stock; a keyboard; and a data processor interposed between said keyboard and said printer, said data processor maintaining a library of preset graphics, said data processor receiving commands from said keyboard and entering alphabetic and numeric data and associated selected ones of said preset graphics upon said label stock through said printer.

DESCRIPTION OF THE DRAWING

For a complete understanding of the objects, techniques, and structure of the invention reference should be made to the following detailed description and accompanying drawing, wherein:

FIG. 1 is an illustrative view of a pressure sensitive adhesive file folder label bearing data thereon generated in accordance with the invention; and FIG. 2 is an illustration of the apparatus of the invention employed in generating the labels of FIG. 1.

BEST MODE FOR CARRYING OUT THE INVENTION

Referring now to the drawing and more particularly FIG. 1, it can be seen that a label made in accordance with the invention is designated generally by the numeral 10. According to the preferred embodiment of the invention, the label 10 comprises a paper strip having a pressure sensitive adhesive layer and release liner on the back surface thereof and having a clear vinyl face sheet adhesively attached over a top data bearing surface thereof. As illustrated, the label 10 carries a multitude of data entries thereon, each imparted in accordance with the invention. It will also be noted that the label 10 is adapted to be folded along a longitudinal center line 12 over the edge of the file folder such that, in this instance, the same data appears on either side of the folder.

It will be appreciated that a wide variety of data entries can be maintained upon the label 10. For instance, the name of the person or patient with whom the file is associated may be maintained as at 14. A file or case number 16 is also provided. A color coded alphabetic designation 18 is also included. Often, though not required, the color coded alphabetic designation 18 will be the first letter of the last name of the individual with whom the file folder is associated. The three most significant digits of the file or case number 16 may be printed at 20, while the two least significant digits of the file number may be provided as color coded designations 22, 24.

Those skilled in the art will readily appreciate the alphabetic color coding 18 and numeric color coding 22, 24 as illustrated on the label 10. According to known file label technology, each letter has associated therewith a particular color. Similarly, each number has a specifically associated color. The identification of misfiles is thus easily determined.

It will also be understood that other data entries may be included upon the label. For example, in the general area 26, the bar code of the data entered upon the label may be maintained, while the area 28 might include the birth date or social security number of the associated individual.

It will be understood that each of various data entries 14–28 is generated and placed upon the label 12 independently of all other data and without regard to any preset template. For example, if the labels 10 were typically intended to include a bar code 26 and birth date 28, it can be seen that the label 10 appears to be complete even absent these entries. For example, if the patient was unable to recall his birth date, the entry 28 would not be made and, if the birth date was to be included in the bar code 26, that entry would be absent as well.

Referring now to FIG. 2, an appreciation may be obtained of the apparatus and associated technique for generating the labels 10, the same being designated generally by the numeral 50. As shown, a piece of pressure sensitive adhesive sheet stock 30 is employed for generating the labels. The sheet stock 30 typically comprises a paper sheet having an adhesive layer on the back thereof, the adhesive layer being covered by a release sheet. The pressure sensitive adhesive sheet stock 30 is introduced to a label generator 32 which may be of any suitable configuration. Often, the label generator 32 will comprise an array of interconnected discrete components such as a keyboard 34, a dedicated microprocessor 36, a video monitor 38, and a color printer 40.

In accordance with the invention, an array of labels may be generated from a mass database by employing the label generator 32. Data associated with each patient is entered from the database via the keyboard 34. The microprocessor 36 contains a library of color graphics such as those employed for the color coded alphabetic designation 18 and the color coded numeric designations 22, 24. In other words, a library of color coded alphanumeric graphics for each letter of the alphabet and at least the numbers 0–9 are maintained within the graphic library. While the graphics may have any desired configuration and/or color arrangement, according to the instant invention each such alphanumeric color coded graphics designation is defined by a center region having a solid color therein which is particularly associated with the alphabetic or numeric character maintained in the respective side boxes. According to a preferred embodiment of the invention, the side boxes are also printed in the same color as the center solid color region. In order words, the side boxes are defined by rectangular windows of a similar color, those colors being associated with the specific number or letter contained therein.

As noted from FIG. 1, the label 10 is divided into regions. The operator enters data into the various regions through the keyboard 34. The operator may simply enter the name and file number in the appropriate regions 14, 16 by typing the same on the keyboard 34. The operator may then designate the letter "C" for entry at the region of the left end of the label 10. The simple designation of the letter "C" retrieves the color graphics designation for the letter "C" from the library and enters it on the label as at 18. Similarly, the color graphics for the numerals 2 and 0 are retrieved from the library and placed as at 22, 24 on the label 10. Entry of the first three most significant numbers of the file numbers may be entered at 20 by the operator via the keyboard 34, or may be simply transferred thereto under a program control upon entry of a file number as at 16. Indeed, such entry may also trigger the selection and application of the color coded numeric designations as at 22, 24.

Had the information regarding the individual's birth date been available, it could have been entered via the keyboard 34 at the area 28. With all such data available, a bar code could have been generated and entered at the region 26.

It will be appreciated that the label 10 is generated by an operator using "clip art" or "cut and paste" technology. In other words, the entered data calls for an associated graphic designation from a library of specific graphics. That graphic designation is entered upon the region of the label which is designated by the operator or under program control.

The appearance of the final label may be presented on the monitor 38 and, if the operator finds the same to be accurate and acceptable, the same is imparted upon an area of the sheet stock 30 designated to define the particularly associated label 10.

It should be appreciated that where no data is entered, the label remains completely blank. There is no template defining any specific regions for data entry, such that additional data may be entered as desired for the label of any particular individual. Moreover, if desired data is absent, the label still has a neat, orderly and complete appearance.

When a number of labels sufficient to fill a sheet 30 have been approved by the operator, they are printed by the printer 40 to define a complete printed sheet 42. A clear vinyl cover sheet 44, having a pressure sensitive adhesive backing, is then laminated to the printed sheet 42 and die cut as at 46 to facilitate removal of each of the individual labels 10 therefrom. As a label 10 is removed, it can be applied to the edge of a file folder 48, as illustrated.

Those skilled in the art will now readily appreciate that the concept of the invention is highly flexible and adapted to a broad range of label generating formats and techniques. Each label is generated independently of all other labels, and each label is complete onto itself. The label generating technique allows for the printing of additional information upon various of the labels, while also accommodating the absence of data from others. Color graphics from a library of alpha-numeric geometric configurations are readily available for printing upon the label as desired. Those graphics may vary from application to application. Moreover, as new files are added to the system, the generation of the associated label is greatly simplified.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A method for generating labels from data in a mass data bank, comprising:

defining a label blank;

entering alphabetic data into first selected regions of said label blank;

entering numeric data into second selected regions of said label blank;

retrieving preset graphics associated with selected portions of said alphabetic and numeric data from a graphics library and entering said retrieved graphics into third selected regions of said label blank, said label blank being defined absent a template defining said first, second and third regions; and printing said label blank, containing said alphabetic and numeric data and said retrieved graphics, upon a label stock material.

2. The method for generating labels according to claim 1, wherein said data is obtained from a mass data bank.

3. The method for generating labels according to claim 1, wherein said graphics comprise color coded alphabetic and numeric designations.

4. The method for generating labels according to claim 3, further comprising laminating a transparent cover sheet over said label stock material.

5. The method for generating labels according to claim 4, further comprising die cutting said label blank from said label stock material.

6. The method for generating labels according to claim 5, wherein said graphics are symmetrically positioned across a longitudinal center line of said label blank.

7. The method for generating labels according to claim 6, further comprising adhesively securing said label to an edge of a file folder along said longitudinal line.

* * * * *